US00RE41233E

(19) United States
(12) Reissued Patent
Pyun et al.

(10) Patent Number: US RE41,233 E
(45) **Date of Reissued Patent: *Apr. 20, 2010**

(54) CATHODE RAY TUBE

(75) Inventors: Do-Houn Pyun, Yongin-si (KR); Wan Kim, Yongin-si (KR); Chan-Yong Kim, Bucheon-si (KR)

(73) Assignee: Samsung SDI Co., Ltd., Suwon-si (KR)

( * ) Notice: This patent is subject to a terminal disclaimer.

(21) Appl. No.: 10/872,145

(22) Filed: Jun. 18, 2004

Related U.S. Patent Documents

Reissue of:
(64) Patent No.: 6,407,496
Issued: Jun. 18, 2002
Appl. No.: 09/767,368
Filed: Jan. 2, 2001

U.S. Applications:
(63) Continuation of application No. 09/440,216, filed on Nov. 15, 1999, now Pat. No. 6,232,712.

(30) Foreign Application Priority Data

Nov. 13, 1998 (KR) ..... 98-48556

(51) Int. Cl.
*H01J 31/00* (2006.01)

(52) U.S. Cl. ..... 313/477 R; 313/408; 313/461; 313/478; 220/2.1 R; 220/2.1 A; 220/2.3 R

(58) Field of Classification Search ..... 313/477 R, 313/408, 461, 478; 220/2.1 R, 2.1 A, 2.3 A, 220/2.3 R, 3.1 A
See application file for complete search history.

(56) References Cited

U.S. PATENT DOCUMENTS 4,535,907 A * 8/1985 Tokita et al.
4,537,321 A * 8/1985 Tokita
4,537,322 A * 8/1985 Okada et al.
4,985,658 A * 1/1991 Canevazzi
5,107,999 A * 4/1992 Canevazzi
5,151,627 A * 9/1992 Van Nes et al.
5,536,995 A * 7/1996 Sugawara et al.
5,663,610 A * 9/1997 Inoue et al.
5,814,933 A * 9/1998 Iwata et al.
6,232,712 B1 * 5/2001 Pyun et al.

FOREIGN PATENT DOCUMENTS

JP 06-036710 * 2/1994
JP 06-044926 * 2/1994

* cited by examiner

*Primary Examiner*—Maricell Santiago
(74) *Attorney, Agent, or Firm*—Christie, Parker & Hale, LLP

(57) ABSTRACT

A cathode ray tube includes a panel having a substantially flat outer surface and an inner curved surface with a phosphor screen. The panel has a substantially rectangular effective screen portion with two long sides parallel to each other, two short sides parallel to each other and four rounded edges interconnecting each long side and the neighboring short side. The effective screen portion is structure such that a first line V1 interconnecting centers of the long sides, a second line H1 interconnecting centers of the short sides and a third line D1 interconnecting centers of the rounded edges opposite to each other meet at a point. The effective screen portion has a first thickness Tv at the centers of the long sides, a second thickness Th at the centers of the short sides, a third thickness Td at the centers of the edges and a fourth thickness Tc at the meeting point of the all three lines V1, H1 and D1. A shadow mask is disposed within the panel so that the shadow mask faces the inner curved surface of the panel. The shadow mask has a curvature corresponding to the inner curved surface of the panel. The ratio of the second thickness Th to the third thickness Td while subtracting the fourth thickness Tc from each thickness satisfies the following condition: $0.75(Th-Tc)/Td-Tc) \leqq 0.85$, and the ratio of the first thickness Tv to the thickness Td while subtracting the fourth thickness Tc from each thickness satisfies the following condition: $0.75 \leqq (Tv-Tc)/(Td-Tc) \leqq 0.85$.

24 Claims, 4 Drawing Sheets

CATHODE RAY TUBE

Matter enclosed in heavy brackets [ ] appears in the original patent but forms no part of this reissue specification; matter printed in italics indicates the additions made by reissue.

CROSS REFERENCE TO RELATED APPLICATIONS

This application is a *reissue of U.S. Pat. No. 6,407,496 B2 which claims priority of* continuation of application Ser. No. 09/440,216, filed Nov. 15, 1999[is now], *which issued as* U.S. Pat. No. 6,232,712, [the disclosure of which is incorporated fully herein by reference,] which in turn claims priority of Korean application No. 98-48556, filed Nov. 13, 1998.

FIELD OF THE INVENTION

The present invention relates to a cathode ray tube (CRT) and, more particularly, to a CRT that can minimize raster distortion of electron beams while maintaining the structural strength of a shadow mask.

BACKGROUND OF THE INVENTION

Generally, a faceplate panel for CRTs has a convex-shaped lens with curved inner and outer surfaces. The convex lens-shaped panel is advantageous in various aspects such as convenience in formation, stability in strength and adaptability for shadow mask application.

However, to the eye of the viewer, it is desirable that the screen image be displayed substantially flat. For this purpose, several attempts have been made to form the inner and outer surfaces of the faceplate panel with a flat shape while maintaining normal display characteristics of the CRT. It is found that when a flat panel is employed for the display screen problems occur in both the convergence characteristics of electron beams and in the strength of a shadow mask. For instance, because the flat-shaped inner surface of the panel is naturally formed with a flat phosphor screen, it becomes difficult to deflect three electron beams of red R, green G and blue B on correct phosphors on the phosphor screen. Furthermore, because the shadow mask facing the flat-shaped inner surface of the panel should also be flat, a desirable shadow mask strength cannot be achieved using the common shadow mask forming technique.

In addition, there is a problem with the flat-panel CRT from the standpoint of the viewer. When the viewer watches a monitor with a flat-shaped panel, the viewer feels that the screen image is sunken at its center portion while protruded at its peripheral portion.

Therefore, it is preferably that the outer surface of the panel is flat whereas the inner surface of the panel is curved.

In such a faceplate panel, as the overall curvature radius of the inner curved surface of the panel becomes smaller, the panel is more easily produced and the shadow mask has a more stable structure capable of reducing a doming phenomenon. However, when the curvature radius falls short of a minimum effective value, the peripheral portion of the panel bears an undesirably large thickness and this results in poor production efficiency as well as high production cost. Furthermore, the transmission rate of the peripheral portion becomes poor due to its large thickness, causing brightness failure.

In order to overcome such problems, various techniques are proposed for a one-sided flat panel CRT application. For example, some techniques are disclosed in Japanese Patent Laid Open Publication No. 6-36710 and No. 6-644926.

However, the technical details are not specified for preserving the structural strength of the shadow mask which should be re-designed pursuant to the curvature radii varying at different positions of the inner curved surface of the panel.

Furthermore, the prior art does not discriminate the desired thickness ratios of a diagonal portion of the panel to the peripheral portion for minimizing distortion of the screen image. Therefore, when the CRT panel is manufactured on the basis of the above-identified techniques, the aforementioned problems remain unsolved.

In the usual sized flat-panel 21-inch, 25-inch and 29-inch CRTs, the thickness ratios of the peripheral portion of the panel to the center portion are 3.13, 2.91 and 2.72, respectively. These ratios are so high that they result in poor production efficiency as well as brightness failure.

SUMMARY OF THE INVENTION

It is an object of an embodiment of the present invention to provide a CRT that can minimize raster distortion of electron beams while maintaining structural strength of a shadow mask.

This and other objects may be achieved by a CRT including a panel having a substantially flat outer surface and an inner curved surface with a phosphor screen. The panel has a substantially rectangular effective screen portion with two long sides parallel to each other, two short sides parallel to each other and four rounded edges interconnecting each long side and the neighboring short side. The effective screen portion structured such that a first line V1 interconnecting centers of the long sides, a second line H1 interconnecting centers of the short sides and a third line D1 interconnecting centers of the rounded edges opposite to each other meet at a point. The effective screen portion has a first thickness Tv at the centers of the long sides, a second thickness Th at the centers of the short sides, a third thickness Td at the centers of the edges and a fourth thickness Tc at the meeting point of the three lines V1, H1 and D1. A shadow mask is disposed within the panel so that it faces the inner curved surface of the panel. The shadow mask has a curvature corresponding to the inner curved surface of the panel.

The ratio of the second thickness Th to the third thickness Td while subtracting the fourth thickness Tc from each thickness satisfies the following condition: $0.75 \leqq (Th-Tc)/(Td-Tc) \leqq 0.85$, and the ratio of the first thickness Tv to the third thickness Td while subtracting the fourth thickness Tc from each thickness satisfies the following condition: $0.75 \leqq (Tv-Tc)/(Td-Tc) \leqq 0.85$. The ratio of the third thickness Td to the fourth thickness Tc satisfies the following condition: $Td/Tc \leqq 2$.

The effective screen portion of the panel has a first curvature radius Rv on the first line V1, a second curvature radius Rh on the second line H1 and a third curvature radius Rd on the third line D1. The curvature radii Rv, Rh and Rd have an inter-relation of $Rv \leqq Rd \leqq Rh$.

DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
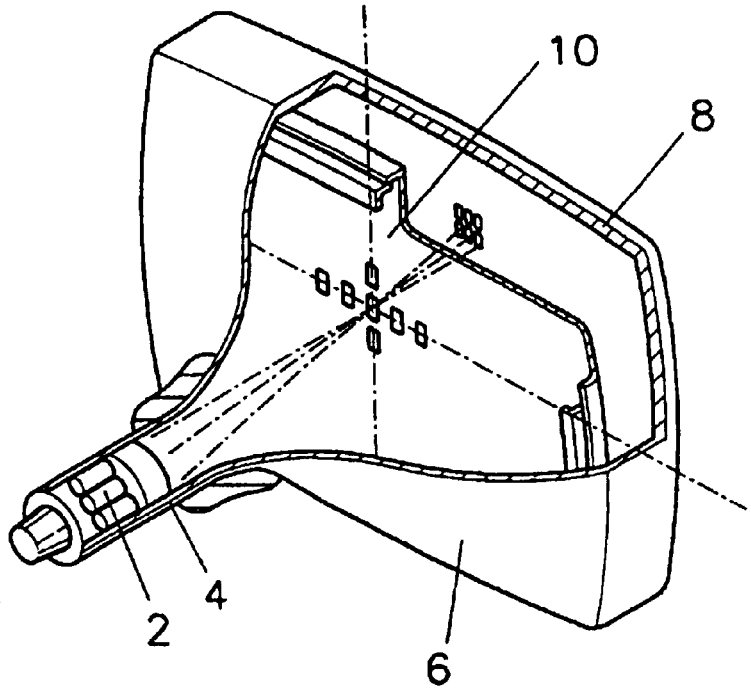
FIG. 1 is a partial sectional perspective view of a CRT with a panel according to a preferred embodiment of the present invention.

As shown in FIG. 1, a CRT according to a preferred embodiment of the present invention includes a neck 4 having an electron gun 2 therein, a funnel 6 connected to the neck 4, and a panel 8 sealed to the funnel 6.

The panel 8 has an inner curved surface with a phosphor screen (not shown) and a substantially flat outer surface. A shadow mask 10 is disposed within the panel 8 and faces the inner curved surface of the panel 8. The shadow mask 10 is curved so that it can be adapted to the inner curved surface of the panel 8.

Figure 2:
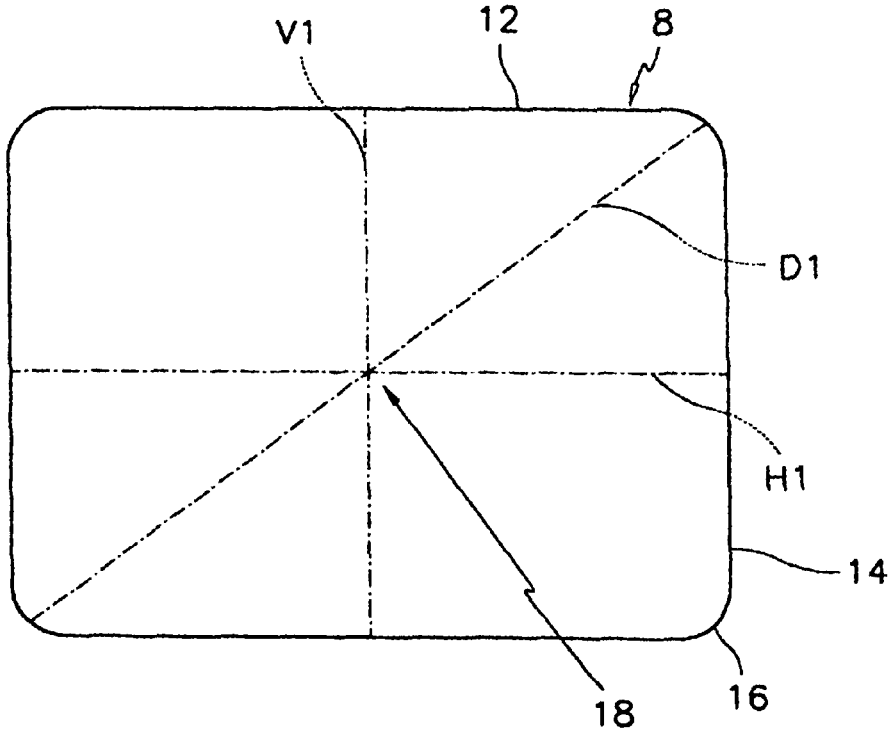
FIG. 2 is a front view of an effective screen portion of the panel shown in FIG. 1.

As shown in FIG. 2, the effective screen portion of the panel 8 has two long sides 12 parallel to each other, two short sides 14 parallel to each other, and four rounded edges 16 interconnecting each long side 12 and the neighboring short side 14. As shown in the drawing, a first virtual line V1 may be drawn such that it interconnects centers of the long sides 12. A second virtual line H1 may be drawn such that it interconnects centers of the short sides 14. A third virtual line D1 may be drawn such that it interconnects centers of the edges 16 opposite to each other. The three virtual lines V1, H1 and D1 are indicated by long and short dashed lines in the drawing, and meet at a point 18.

The effective screen portion of the panel 8 has a first thickness Tv at the centers of the long sides 12, a second thickness Th at the centers of the short sides 14, a third thickness Td at the centers of the edges 16, and a fourth thickness Tc at the meeting point 18 of the three virtual lines V1, H1 and D1.

The ratio of the second thickness Th to the third thickness Td while subtracting the fourth thickness Tc from each thickness is established to satisfy the following condition: $0.75 \leqq (Th-Tc)/(Td-Tc) \leqq 0.85$. Furthermore, the ratio of the first thickness Tv to the third thickness Td while subtracting the fourth thickness Tc from each thickness is established to satisfy the following condition: $0.75 \leqq (Tv-Tc)/(Td-Tc) \leqq 0.85$.

In the above conditions, when the minimum value is smaller than 0.75, raster distortion due to the deflection of the electron beams increases. In contrast, when the maximum value is higher than 0.85, the inner surface of the panel 8 has an excessively small curvature, and the shadow mask 10 accordingly has an overall curvature so small that it cannot adequately maintain its strength.

Figure 3:
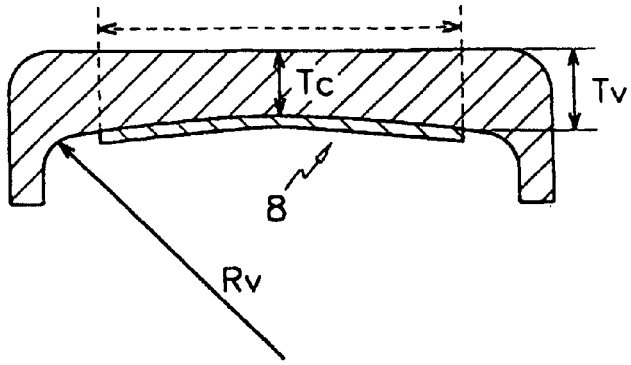
FIG. 3 is a sectional view of the panel shown in FIG. 1 taken along the virtual line V1 of FIG. 2.
Figure 4:
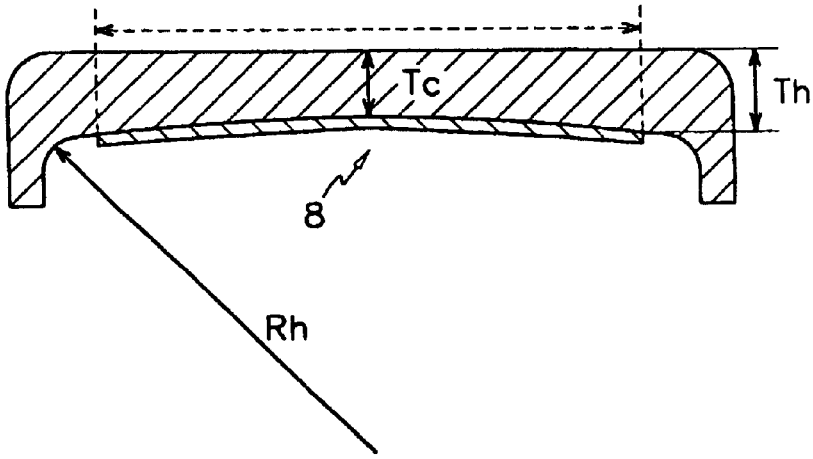
FIG. 4 is another sectional view of the panel shown in FIG. 1 taken along the virtual line H1 of FIG. 2.
Figure 5:
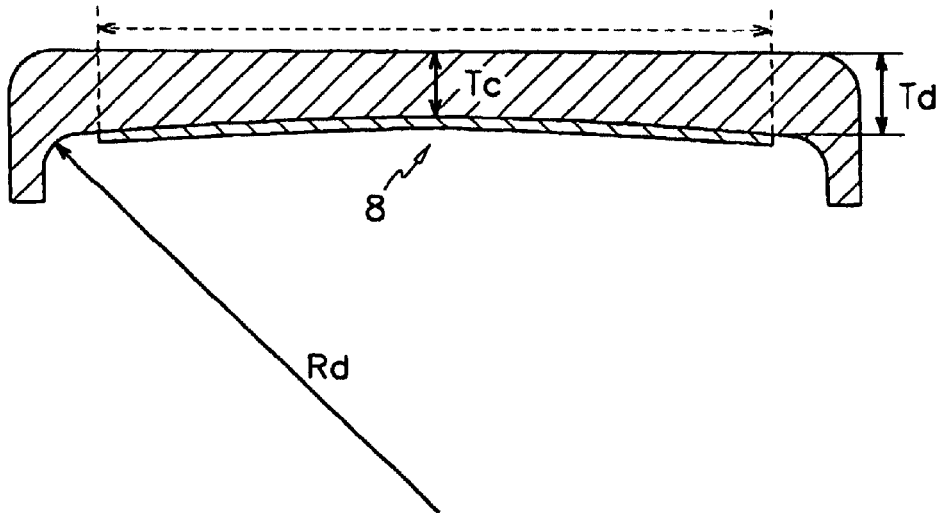
FIG. 5 is another sectional view of the panel shown in FIG. 1 taken along the virtual line D1 of FIG. 2.

As shown in FIG. 3, the first thickness Tv is a value measured at the thickest portion of the effective screen area on the first virtual line V1. As shown in FIG. 4, the second thickness Th is a value measured at the thickest portion of the effective screen area on the second virtual line H1. As shown in FIG. 5, the third thickness Td is a value measured at the thickest portion of the effective screen area on the third virtual line D1.

The values satisfying the above-identified thickness conditions in a 25-inch CRT panel and a 29-inch CRT panel are indicated in Table 1.

TABLE 1

| | 25-inch CRT panel | 29-inch CRT panel |
|---|---|---|
| Td-Tc (mm) | 25.4 | 26.3 |
| Th-Tc (mm) | 20.0 | 21.8 |
| Tv-Tc (mm) | 20.8 | 20.3 |
| (Th-Tc)/(Td-Tc) | 0.79 | 0.83 |
| (Tv-Tc)/(Td-Tc) | 0.82 | 0.77 |

Meanwhile, the ratio of the third thickness Td to the fourth thickness Tc is established to satisfy the condition of $Td/Tc \leqq 2$. In this condition, the screen image distortion can be effectively minimized.

The inner curved surface of the panel 8 has a first curvature radius Rv on the virtual line V1, a second curvature radius Rh on the second virtual line H1, and a third curvature radius Rd on the third virtual line D1. These curvature radii Rh, Rv and Rd have an inter-relation of $RV \leqq Rd \leqq Rh$.

In a preferred embodiment of the present invention, the ratio of the thickness Th to the thickness Tc is established to satisfy the following condition: $1.4 \leqq Th/Tc \leqq 1.6$. Furthermore, the ratio of the third thickness Td to the fourth thickness Tc is established to satisfy the following condition: $1.7 \leqq Td/Tc \leqq 2.0$. In additional embodiments, the inner curved surface of the panel 8 may have a unique curvature radius or varying curvature radii at different positions. Under these conditions, the panel 8 also exhibits good performance characteristics.

As described above, the inventive CRT has a panel with an effective screen portion that is structured to bear ideal thickness ratios among its respective portions as well as suitable curvature radii. As a result, raster distortion of the electron beams is minimized and suitable structural strength of the corresponding shadow mask is obtained.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A cathode ray tube comprising:

a panel having a substantially flat outer surface and an inner curved surface with a phosphor screen, the panel having a substantially rectangular effective screen portion with two long sides parallel to each other, two short sides parallel to each other and four rounded edges *each* interconnecting [each] *a* long side and [the] *a* neighboring short side *respectively*, the effective screen portion being structured such that a first line V1 interconnecting centers of the long sides, a second line H1 interconnecting centers of the short sides and a third line D1 interconnecting centers of the rounded edges opposite to each other meet at a point, the effective screen portion having a first thickness Tv at the centers of the long sides, a second thickness Th at the centers of the short sides, a third thickness Td at the centers of the edges and a fourth thickness Tc at the meeting point of the first to third lines V1, H1 and D1;

wherein the ratio of the second thickness Th to the third thickness Td while subtracting the fourth thickness Tc from each thickness satisfies the following condition: $0.75 \leqq (Th-Tc)/(Td-Tc) \leqq 0.85$, and the ratio of the first thickness Tv to the third thickness Td while subtracting the fourth thickness Tc from each thickness satisfies the following condition: $0.75 \leqq (Tv-Tc)/(Td-Tc) \leqq 0.85$.

2. The cathode ray tube of claim 1 wherein the ratio of the third thickness Td to the fourth thickness Td satisfies the following condition: Td/Tc≦2.

3. The cathode ray tube of claim 1 wherein the effective screen portion of the panel has a first curvature radius Rv at the first line V1, curvature radius Rh at the second line H1 and a third curvature radius Rd at the third line D1, and the curvature radii Rv, Rh and Rd have an inter-relation of Rv≦Rd≦Rh.

4. A cathode ray tube comprising:

a panel having a substantially flat outer surface and an inner curved surface with a phosphor screen, the panel having a substantially rectangular effective screen portion with two long sides parallel to each other, two short sides parallel to each other and four rounded edges *each* interconnecting [each] *a* long side and [the] *a* neighboring short side *respectively*, the effective screen portion being structured such that a first line V1 interconnecting centers of the long sides, a second line H1 interconnecting centers of the short sides and a third line D1 interconnecting centers of the rounded edges opposite to each other meet at a point, the effective screen portion having a first thickness Tv at the centers of the long sides, a second thickness Th at the centers of the short sides, a third thickness Td at the centers of the edges and a fourth thickness Tc at the meeting point of the first to third lines V1, H1 and D1;

wherein the ratio of the second thickness Th to the fourth thickness Tc satisfies the following condition: 1.4≦Th/Tc≦1.6, and the ratio of the third thickness Td to the fourth thickness Tc satisfies the following condition: 1.7≦Td/Tc≦2.0.

5. The cathode ray tube of claim 4 wherein the effective screen portion of the panel has a first curvature radius Rv on the first line V1, a second curvature radius Rh on the second line H1 and a third curvature radius Rd on the third line D1, and the curvature radii Rv, Rh and Rd have an inter-relation of Rv≦Rd≦Rh.

6. The cathode ray tube of claim 5 wherein the inner curved surface of the panel has a unique curvature radius or varying curvature radii at different positions.

7. The cathode ray tube of claim 6 wherein the curvature radii Rv, Rh, and Rd are all either constant throughout the inner surface of the panel or varying at different positions.

8. A cathode ray tube comprising:

a panel having a substantially flat outer surface and an inner curved surface with a phosphor screen, the panel having a substantially rectangular effective screen portion with two first sides parallel to each other, two second sides parallel to each other, the second two sides being shorter than the first two sides, and four rounded edges each interconnecting one of the first sides with one of the second sides, the effective screen portion having a first thickness Tv at a center of one of the first sides, a second thickness Th at a center of one of the second sides, a third thickness Td at a center of one or the rounded edges and a fourth thickness Tc at a center of the effective screen portion; and wherein a thickness ratio of the effective screen portion satisfies the following conditions: 0.75≦(Th−Tc)/(Td−Tc)≦0.85, and 0.75≦(Tv−Tc)/(Td−Tc)≦0.85.

9. The cathode ray tube of claim 8 wherein the thickness ratio of the effective screen portion further satisfies the following condition: Td/Tc≦2.

10. The cathode ray tube of claim 8 wherein the effective screen portion of the panel has a curvature radius along a first line between the centers of the first sides, a curvature radius along a second line between the centers of the second sides, and a curvature radius along a diagonal line between the centers of two of the rounded [corners]*edges*, wherein the maximum curvature of radius along the first line and the minimum curvature of radius along the second line are equal to the curvature of radius along the diagonal line.

11. A cathode ray tube comprising:

a panel having a substantially flat outer surface and an inner curved surface with a phosphor screen, the panel having a substantially rectangular effective screen portion with two first sides parallel to each other, two second sides parallel to each other, the second two sides being shorter than the first two sides, and four rounded edges each interconnecting one of the first sides with one of the second sides, the effective screen portion having a first thickness Tv at a center of one of the first sides, a second thickness Th at a center of one of the second sides, a third thickness Td at a center of one of the edges and a fourth thickness Tc at a center of the effective screen portion; and wherein a thickness ratio of the effective screen portion satisfies the following conditions: 1.4≦Th/Tc≦1.6, and 1.7≦Td/Tc≦2.0.

12. The cathode ray tube of claim 11 wherein the effective screen portion of the panel has a curvature radius along a first line between the centers of the first sides, a curvature radius along a second line between the centers of the second sides, and a curvature radius along a diagonal line between the centers of two of the rounded [corners]*edges*, wherein the maximum curvature of radius along the first line and the minimum curvature of radius along the second line are equal to the curvature of radius along the diagonal line.

*13. A cathode ray tube comprising:*

*a panel having a substantially flat outer surface and an inner curved surface with a phosphor screen, the panel having an effective screen portion with two first sides substantially parallel to each other, two second sides substantially parallel to each other and edges, the edges located where each said first side and each neighboring said second side meet, the effective screen portion being structured such that a first line V1 interconnecting centers of the first sides, a second line H1 interconnecting centers of the second sides and a third line D1 interconnecting the edges which are opposite to each other, meet at a point, the effective screen portion having a first thickness Tv at the centers of the first sides, a second thickness Th at the centers of the second sides, a third thickness Td at the centers of the edges and a fourth thickness Tc at the meeting point of the first, second and third lines V1, H1 and D1;*

*wherein the ratio of the second thickness Th to the third thickness Td while subtracting the fourth thickness Tc from each thickness satisfies the following condition: 0.75≦(Th−Tc)/(Td−Tc)≦0.85, and the ratio of the first thickness Tv to the third thickness Td while subtracting the fourth thickness Tc from each thickness satisfies the following condition: 0.75≦(Tv−Tc)/(Td−Tc)≦0.85.*

*14. The cathode ray tube of claim 13 wherein the ratio of the third thickness Td to the fourth thickness Td satisfies the following condition: Td/Tc≦2.*

*15. The cathode ray tube of claim 13 wherein the effective screen portion of the panel has a first curvature radius Rv at the first line V1, curvature radius Rh at the second line H1 and a third curvature radius Rd at the third line D1, and the curvature radii Rv, Rh and Rd have an inter-relation of Rv≦Rd≦Rh.*

*16. A cathode ray tube comprising:*

*a panel having a substantially flat outer surface and an inner curved surface with a phosphor screen, the panel having an effective screen portion with two first sides substantially parallel to each other, two second sides substantially parallel to each other and edges, the edges located where each said first side and each neighboring said second side meet, the effective screen portion being structured such that a first line V1 interconnecting centers of the first sides, a second line H1 interconnecting centers of the second sides and a third line D1 interconnecting the edges which are opposite to each other, meet at a point, the effective screen portion having a first thickness Tv at the centers of the long sides, a second thickness Th at the centers of the short sides, a third thickness Td at the centers of the edges and a fourth thickness Tc at the meeting point of the first, second and third lines V1, H1 and D1;*

*wherein the ratio of the second thickness Th to the fourth thickness Tc satisfies the following condition: $1.4 \leqq Th/Tc \leqq 1.6$, and the ratio of the third thickness Td to the fourth thickness Tc satisfies the following condition: $1.7 \leqq Td/Tc \leqq 2.0$.*

*17. The cathode ray tube of claim 16 wherein the effective screen portion of the panel has a first curvature radius Rv on the first line V1, a second curvature radius Rh on the second line H1 and a third curvature radius Rd on the third line D1, and the curvature radii Rv, Rh and Rd have an inter-relation of $Rv \leqq Rd \leqq Rh$.*

*18. The cathode ray tube of claim 17 wherein the inner curved surface of the panel has a unique curvature radius or varying curvature radii at different positions.*

*19. The cathode ray tube of claim 18 wherein the curvature radii Rv, Rh, and Rd are all either constant throughout the inner surface of the panel or varying at different positions.*

*20. A cathode ray tube comprising:*

*a panel having a substantially flat outer surface and an inner curved surface with a phosphor screen, the panel having an effective screen portion with two first sides substantially parallel to each other, two second sides substantially parallel to each other, and edges, the edges located where each said first side and each neighboring said second side meet, the effective screen portion having a first thickness Tv at a center of one of the first sides, a second thickness Th at a center of one of the second sides, a third thickness Td at one of the edges and a fourth thickness Tc at a center of the effective screen portion; and*

*wherein a thickness ratio of the effective screen portion satisfies the following conditions: $0.75 \leqq (Th-Tc)/(Td-Tc) \leqq 0.85$, and $0.75 \leqq (Tv-Tc)/(Td-Tc) \leqq 0.85$.*

*21. The cathode ray tube of claim 20 wherein the thickness ratio of the effective screen portion further satisfies the following condition: $Td/Tc \leqq 2$.*

*22. The cathode ray tube of claim 20 wherein the effective screen portion of the panel has a curvature radius along a first line between the centers of the first sides, a curvature radius along a second line between the centers of the second sides, and a curvature radius along a diagonal line between two of the edges, wherein the maximum curvature of radius along the first line and the minimum curvature of radius along the second line are equal to the curvature of radius along the diagonal line.*

*23. A cathode ray tube comprising:*

*a panel having a substantially flat outer surface and an inner curved surface with a phosphor screen, the panel having an effective screen portion with two first sides substantially parallel to each other, two second sides substantially parallel to each other, and edges, the edges located where each said first side and each neighboring said second side meet, the effective screen portion having a first thickness Tv at a center of one of the first sides, a second thickness Th at a center of one of the second sides, a third thickness Td at a center of one of the edges and a fourth thickness Tc at a center of the effective screen portion; and*

*wherein a thickness ratio of the effective screen portion satisfies the following conditions: $1.4 \leqq Th/Tc \leqq 1.6$, and $1.7 \leqq Td/Tc \leqq 2.0$.*

*24. The cathode ray tube of claim 23 wherein the effective screen portion of the panel has a curvature radius along a first line between the centers of the first sides, a curvature radius along a second line between the centers of the second sides, and a curvature radius along a diagonal line between two of the edges, wherein the maximum curvature of radius along the first line and the minimum curvature of radius along the second line are equal to the curvature of radius along the diagonal line.*

* * * * *